(12) United States Patent
Wan

(10) Patent No.: US 8,392,415 B2
(45) Date of Patent: Mar. 5, 2013

(54) CLUSTERING OF CONTENT ITEMS

(75) Inventor: Ernest Yiu Cheong Wan, Carlingford (AU)

(73) Assignee: Canon Information Systems Research Australia Pty. Ltd., New South Wales (AU)

( * ) Notice: Subject to any disclaimer, the term of this patent is extended or adjusted under 35 U.S.C. 154(b) by 716 days.

(21) Appl. No.: 11/561,661

(22) Filed: Nov. 20, 2006

(65) Prior Publication Data

US 2007/0136275 A1 Jun. 14, 2007

(30) Foreign Application Priority Data

Dec. 12, 2005 (AU) ................................ 2005242221
Dec. 12, 2005 (AU) ................................ 2005242223

(51) Int. Cl.
*G06F 17/30* (2006.01)
(52) U.S. Cl. ...................................................... 707/737
(58) Field of Classification Search .................. 707/1, 7, 707/100, 102, 737

See application file for complete search history.

(56) References Cited

U.S. PATENT DOCUMENTS

| | | | | |
|---|---|---|---|---|
| 5,631,975 | A * | 5/1997 | Riglet et al. | 382/173 |
| 6,598,054 | B2 * | 7/2003 | Schuetze et al. | 707/103 R |
| 6,606,411 | B1 * | 8/2003 | Loui et al. | 382/224 |
| 2005/0069207 | A1 * | 3/2005 | Zakrzewski et al. | 382/190 |
| 2005/0074834 | A1 * | 4/2005 | Chaplen et al. | 435/34 |
| 2005/0175243 | A1 * | 8/2005 | Luo et al. | 382/224 |
| 2006/0078312 | A1 * | 4/2006 | Murata et al. | 386/117 |
| 2006/0126944 | A1 * | 6/2006 | Loui et al. | 382/224 |
| 2007/0081088 | A1 * | 4/2007 | Gotoh et al. | 348/333.01 |

OTHER PUBLICATIONS

Platt, John, et al., "PhotoTOC: Automatic Clustering for Browsing Personal Photographs" Feb. 2002, Microsoft, pp. 0, 1, 1-19.*
Platt, John C., "AutoAlbum: Clustering Digital Photograps using Probabilistic Model Merging" 2000, IEEE, pp. 1-6.*
Graham, Adrian et al., "Time as Essence for Photo Browsing Through Personal Digital Libraries", 2002, ACM, pp. 326-335.*
Masaki Sekiya, et al., "Digital Still Camera" Jul. 25, 2003, JPO (translation of japanese application 2003209790), p. 0-39.*

* cited by examiner

*Primary Examiner* — Amresh Singh
(74) *Attorney, Agent, or Firm* — Fitzpatrick, Cella, Harper & Scinto

(57) ABSTRACT

A method for clustering a plurality of content items. The method comprises, determining intervals between at least some of the content items, and then selecting a seed pair of content items using the determined intervals. The seed pair is then assigned to a current cluster, before an interval is determined between one of the content items in the current cluster and a neighboring one of the content items. The interval is then compared to a predetermined criterion in response to a successful comparison, the content item is assigned to the cluster.

25 Claims, 13 Drawing Sheets

| Interval | Successive Photo Pair | |
|---|---|---|
| | Photo 1 | Photo 2 |
| $i_{11}$ | 11 | 12 |
| $i_{12}$ | 12 | 13 |
| $i_2$ | 2 | 3 |
| $i_5$ | 910 5 | 6 |
| $i_9$ | 9 | 10 |
| $i_1$ | 1 | 2 |
| $i_{10}$ | 10 | 11 |
| $i_8$ | 8 | 9 |
| $i_6$ | 6 | 7 |
| $i_{14}$ | 14 | 15 |
| $i_{13}$ | 13 | 14 |
| $i_3$ | 3 | 4 |
| $i_7$ | 7 | 8 |
| $i_4$ | 4 | 5 |

Fig. 9 reference scaled

CLUSTERING OF CONTENT ITEMS

FIELD OF THE INVENTION

The present invention relates to the clustering of a plurality of content items, and in particular, the clustering of content items using a seed pair to grow clusters, and also to the clustering of content items in accordance with clustering rules.

DESCRIPTION OF BACKGROUND ART

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Typically, a digital camera user will take photos for one or more events and then download the photos from a memory card to a storage device (such as the hard disk of a PC or a Media Adaptor) and then archive it to a storage media such as a DVD or CD. Often, a user will only download the photos from a memory card when it becomes full.

Depending on the capacity of the memory card and whether the user is an ardent camera user or not, the downloaded photos may include events that span a few hours to a few months. Accordingly, as users start to accumulate a large collection of digital photos, searching and even browsing through the photos is no longer as enjoyable as it used to be. Additionally, users find it increasingly more difficult to recall the particular circumstances under which the photos were taken. Organising the photos before archiving them would help but organising even a few tens of photos is considered a tedious task by the average camera user.

A number of the more recent applications for managing photos have attempted to separate photos into time-based event clusters with various degree of success. Nevertheless, they typically divide the photos into a list of relatively short events and inevitably fail to recognise longer events as well as the relationship between long and short events. For example, a Europe Trip that is usually made up of shorter events such as a weekend at Paris, which in turn, can be made up of even shorter events such as a Moulin Rouge show.

Clustering of photos is typically performed using time-based event clustering. Most time-based event clustering techniques process the photos in chronological order creating new event clusters when the time gap (or interval) between neighbouring photos is greater than a certain threshold. The threshold may be a predetermined constant, a function of a windowed average of the time gaps between neighbouring photos of a current cluster or a function of the temporal extent of the current cluster. These methods create a single level of photo clusters. Some systems further partition the first level of photo clusters using content-based clustering into smaller sub-clusters of similar images, typically, by comparing the colour histogram of the images.

The problem with using a constant threshold on time gap is that such threshold does not work well on all photo sets. For instance, the events of a wedding are much shorter than the events of a vacation. Comparing the time gap against the average or extent of the time gap of a 'current' cluster ensures that the clustering is less dependent on the type of photo set. Nevertheless, the fact that existing algorithms always process photos in chronological order to create a single level of clusters means that the existence of an abnormally large time gap early in the construction of a 'current' cluster will easily result in a large cluster that misses all the smaller events.

Furthermore, content-based clustering using image features including the commonly used colour histogram, is far less reliable than time-based clustering. Hence, subsequent content-based sub-clustering of large clusters cannot satisfactorily correct errors caused by time-based event clustering.

Although production rules have been used to take into account of both temporal proximity and content similarity simultaneously when clustering photos, the use of crisp thresholds in such production rules do not allow the different criteria to be weighed and combined effectively, and consequently are very sensitive to boundary conditions.

Although hierarchical clustering of images for retrieval purposes, also exists, these algorithms typically perform content-based clustering by computing similarity measures over a set of image features and grouping similar images into clusters. A hierarchy of clusters can be formed by applying different image features to create new sub-clusters in a top-down manner or repeatedly combining similar clusters into larger intermediate clusters in a bottom-up manner. The use of content-based clustering instead of time-based event clustering in these methods means that these prior art differs substantially from the current invention.

SUMMARY OF THE PRESENT INVENTION

It is an object of the present invention to substantially overcome, or at least ameliorate, one or more disadvantages of existing arrangements.

In a first broad form the present invention provides a method for clustering a plurality of content items, the method comprising, in a processing system:
   a) determining intervals between at least some of the content items;
   b) selecting a seed pair of content items using the determined intervals;
   c) assigning the seed pair to a current cluster;
   d) determining an interval between one of the content items in the current cluster and a neighbouring one of the content items;
   e) comparing the interval to a predetermined criterion; and,
   f) in response to a successful comparison, assigning the content item to the cluster.

In a second broad form the present invention provides an apparatus for clustering a plurality of content items, the apparatus comprising a processing system, the processing system being for:
   a) determining intervals between at least some of the content items;
   b) selecting a seed pair of content items using the determined intervals;
   c) assigning the seed pair to a current cluster;
   d) determining an interval between one of the content items in the current cluster and a neighbouring one of the content items;
   e) comparing the interval to a predetermined criterion; and,
   f) in response to a successful comparison, assigning the content item to the cluster.

In a third broad form the present invention provides a computer program product for use in clustering a plurality of content items, the computer program product being formed from computer executable code, which when executed on a suitable processing system causes the processing system to:

a) determine intervals between at least some of the content items;
b) select a seed pair of content items using the determined intervals;
c) assign the seed pair to a current cluster;
d) determine an interval between one of the content items in the current cluster and a neighbouring one of the content items;
e) compare the interval to a predetermined criterion; and,
f) in response to a successful comparison, assign the content item to the cluster.

In a fourth broad form the present invention provides a method of clustering a plurality of content items, the method comprising, in a processing system:
a) determining a plurality of ordered content items;
b) determining intervals between at least some neighbouring content items;
c) determining a set of clustering rules based on at least one of the determined intervals; and,
d) assigning at least one content item to a cluster using the determined clustering rules.

In a fifth broad form the present invention provides an apparatus for organising a plurality of content items into one or more clusters, the apparatus comprising the processing system, the processing system being for:
a) determining a plurality of ordered content items;
b) determining intervals between at least some neighbouring content items;
c) determining a set of clustering rules based on at least one of the determined intervals; and,
d) assigning at least one content item to a cluster using the determined clustering rules.

In a sixth broad form the present invention provides a computer program product for use in organising a plurality of content items into one or more clusters, the computer program product being formed from computer executable code, which when executed on a suitable processing system causes the processing system to:
a) determine a plurality of ordered content items;
b) determine intervals between at least some neighbouring content items;
c) determine a set of clustering rules based on at least one of the determined intervals; and,
d) assign at least one content item to a cluster using the determined clustering rules.

BRIEF DESCRIPTION OF THE DRAWINGS

An example of the present invention will now be described with reference to the accompanying drawings, in which:

FIG. 9 is a list of photo pairs of the example photo collection used in FIG. 8 in ascending order of their intervals;

DETAILED DESCRIPTION INCLUDING BEST MODE

Figure 1:
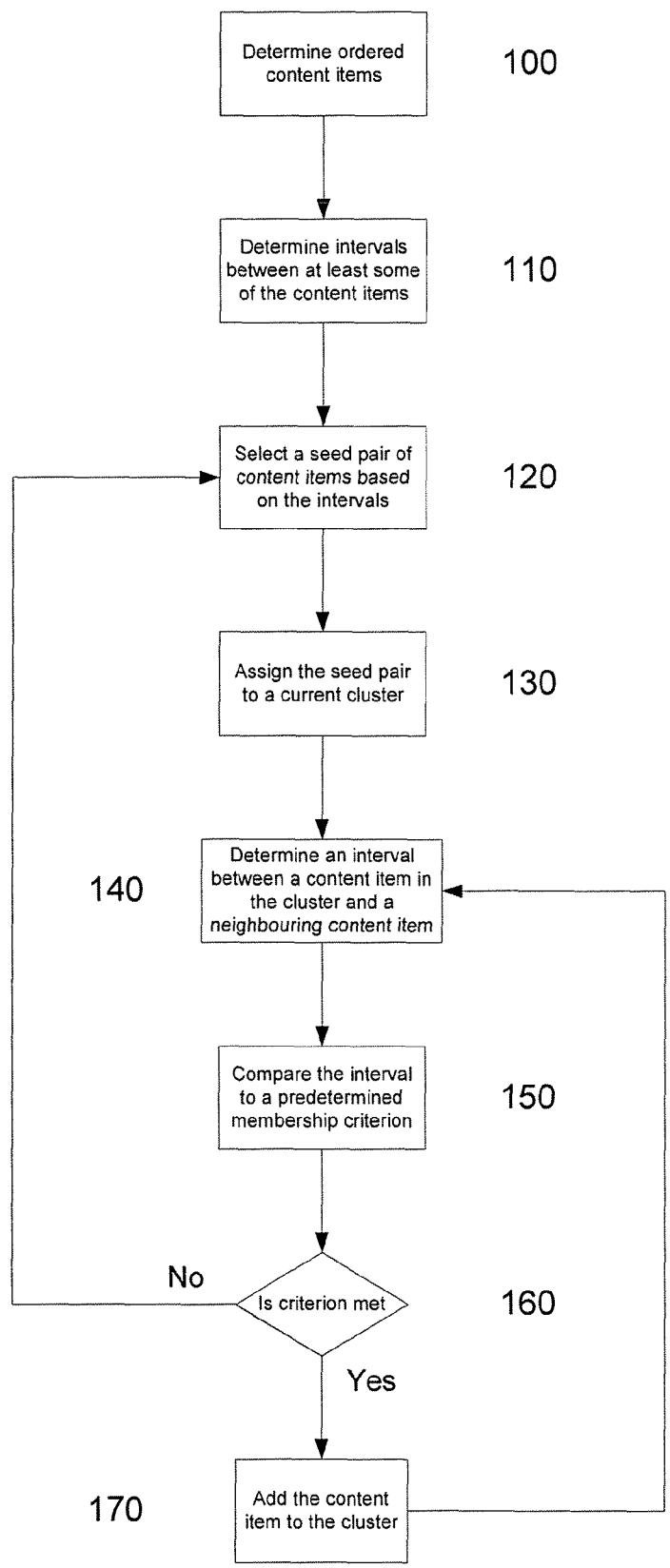
FIG. 1 is a flow chart of an example of a process of clustering content items.

An example of the process for organising content items into clusters will now be described with reference to FIG. 1.

At step 100 a plurality of ordered content items are determined. The ordering can be performed in any suitable manner, but is typically achieved by ordering the content items based on the value of a variable, such as the time or location at which the content item was created. Alternatively, or additionally, other variables can be used depending on the nature of the content items. The ordering may be predetermined, or may require sorting of the content items, as required.

At step 110 intervals between neighbouring content items are determined for at least some of the ordered content items, with the intervals being used to select a seed pair of content items at step 120. The seed pair is used in forming clusters, and can be selected in any one of a number of ways, such as by selecting the content items for which the interval is smallest, as will be described in more detail below.

At step 130, the seed pair is assigned to a current cluster, and at step 140, an interval between content items in the cluster and a neighbouring one of the ordered content items is determined. At step 150, the interval is compared to at least one predetermined membership criterion, such as an interval threshold, with the result of this comparison being used at step 160, to assess if the content item is to be added to the cluster at step 170. In the event that the content item is not added, then the process can return to step 120 to select a new seed pair. Otherwise, the process can return to step 140, to assess another one of the neighbouring content items.

Accordingly, the above described process operates to select a seed pair, which is then assigned to a current cluster. An attempt is made to grow the current cluster by adding in neighbouring ones of the ordered content items.

Thus, for example, clusters can be grown by adding content items that neighbour clustered content items in the ordering determined at step 100 above, if the interval between the neighbouring content item and one or more clustered content items satisfy at least one predetermined criterion, such as a threshold interval value.

As part of this process, a cluster hierarchy can be developed by establishing related clusters. A related cluster can be formed in a number of ways, but typically occurs if a content item being added to the current cluster is already a member of an existing cluster. In this case, if the neighbouring content item is already a member of a cluster, this can be used to form a relationship between the two clusters. Similarly, if a seed pair content item used to grow a cluster is already a member of another cluster, then again a relationship can be created.

Figure 2:
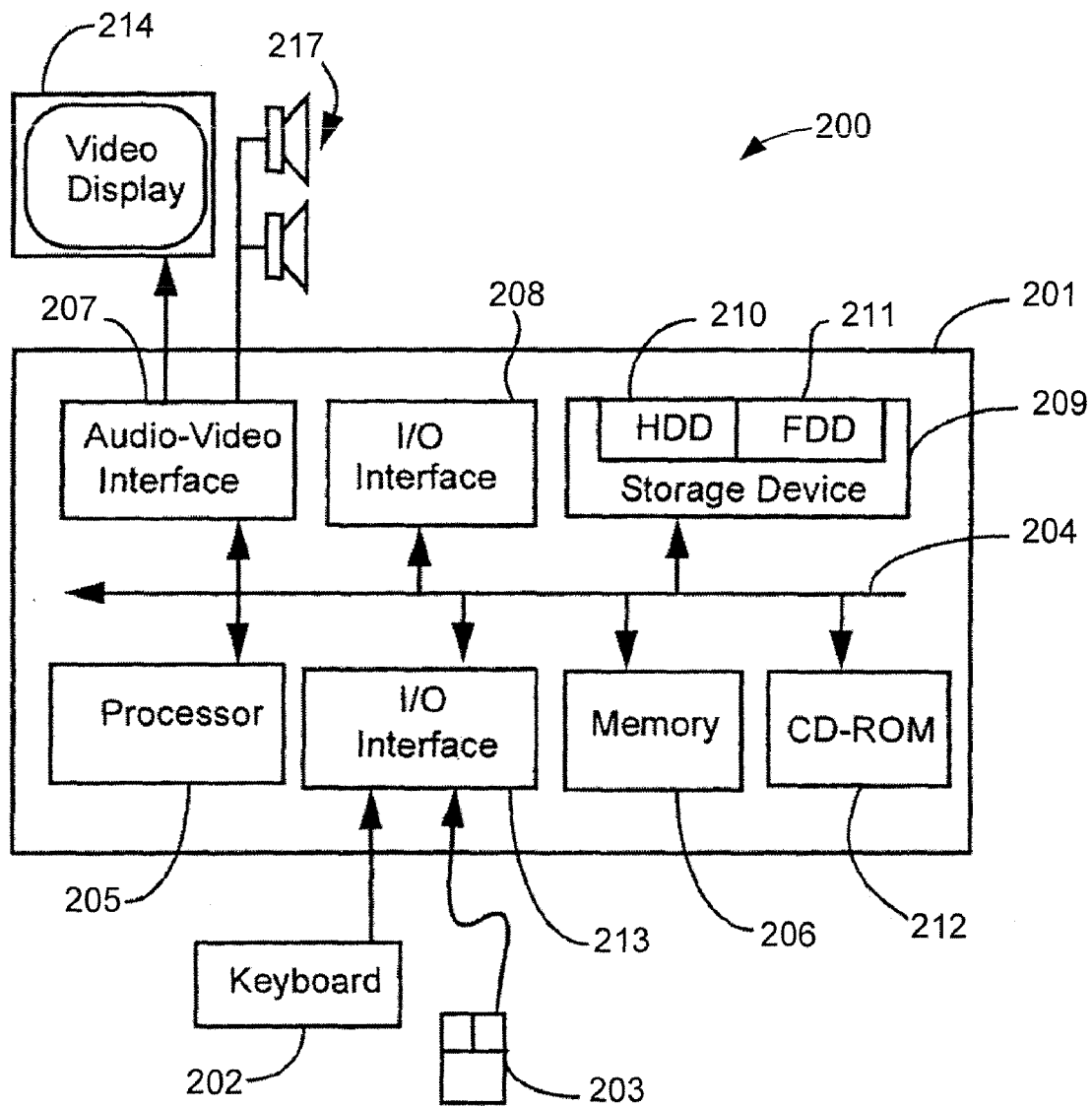
FIG. 2 is a schematic diagram of an example of a processing system.

In general, the process of clustering content items is typically performed using a general-purpose computer system, to allow the process to be automated. An example of a suitable general-purpose computer system is shown in FIG. 2.

The computer system 200 is formed by a computer module 201, input devices such as a keyboard 202 and mouse 203, and output devices including a printer 215, a display device 214 and loudspeakers 217.

The computer module 201 typically includes at least one processor unit 205, and a memory unit 206, formed for example from semiconductor random access memory (RAM) and read only memory (ROM). The module 201 also includes an number of input/output (I/O) interfaces including an audio-video interface 207 that couples to the video display 214 and loudspeakers 217, and an I/O interface 213 for the keyboard 202 and mouse 203 and optionally a joystick (not illustrated). An I/O interface 208, such as a network interface card (NIC) is also typically used for connecting to the computer to a network (not shown), and/or one or more peripheral devices.

A storage device 209 is provided and typically includes a hard disk drive 210 and a floppy disk drive 211. A magnetic tape drive (not illustrated) may also be used. A CD-ROM drive 212 is typically provided as a non-volatile source of data.

The components 205 to 213 of the computer module 201, typically communicate via an interconnected bus 204 and in a manner that results in a conventional mode of operation of the computer system 200 known to those in the relevant art. Examples of computers on which the described arrangements can be practised include IBM-PC's and compatible's, Sun SPARCstation's or the like.

The processes of clustering content items is typically implemented using software, such as one or more application programs executing within the computer system 200. The video display 214 of the computer system 200 may use a GUI (Graphical User Interface) to display clusters of content items.

In particular, the methods and processes are affected by instructions in the software that are carried out by the computer. The instructions may be formed as one or more code modules, each for performing one or more particular tasks. The software may be stored in a computer readable medium, and loaded into the computer, from the computer readable medium, to allow execution. A computer readable medium having such software or computer program recorded on it is a computer program product. The use of the computer program product in the computer generally affects an advantageous apparatus for clustering of content items.

The term "computer readable medium" as used herein refers to any storage or transmission medium that participates in providing instructions and/or data to the computer system 200 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 201. Examples of transmission media include radio or infra-red transmission channels as well as a network connection to another computer or networked device, and the Internet or Intranets including e-mail transmissions and information recorded on Websites and the like.

In one example, the computer system 200 can determine the ordered content items at step 100 by arranging the content items according to the value of a selected variable, such as the time at which the content item was created.

Once the content items have been ordered, the method can include computing the intervals between each neighbouring content item, and then sorting pairs of neighbouring content items in ascending order of the computed intervals. The intervals between neighbouring content items can then be determined on the basis of differences in the value of the variable between neighbouring content items, so that in one example, the intervals can be temporal or spatial intervals.

In general, a current pair is selected from the sorted pairs by determining if the seed pair content items are members of an existing cluster. If at least one seed pair content item is not a member of an existing cluster, the current pair is assigned to be a seed pair. Otherwise, another current pair is selected if both seed pair content items are members of existing clusters.

A neighbouring item is then selected from the list of ordered items, and the interval between the neighbouring content item and the current cluster is compared to the predetermined criterion. If the comparison is successful, the neighbouring content item is assigned to be a member of the current cluster. However, if the comparison is unsuccessful, either another neighbouring content item is selected, or another seed pair is selected. Alternatively, a content item property of the neighbouring content item is compared to an equivalent content item property for a content item in the current cluster, with the content item being added to the cluster depending on the results of the comparison. Notably, the content item property can include statistical criteria of the content item.

In one example, fuzzy logic rules are used to combine predetermined criterion on interval and particular properties of content items to determine if a neighbouring item should be assigned to the current cluster.

In one example, the predetermined criterion includes an interval threshold. The predetermined criterion can be determined in any one of a number of manners and may be selected based on a type of event to which the content items relate, or additionally, or alternatively can be computed based on interval statistics for a subset of content items in the current cluster.

In one example, the clustered content items form a network of related clusters, nested clusters, a hierarchical cluster structure, or the like. Thus, for example, the related cluster can be a sub-cluster of the current cluster, with the clusters having a parent-child relationship.

The process can also include combining two related clusters by forming a single cluster containing content items from the two clusters, thereby removing a part of the nested or hierarchical structure. Thus, two related child and parent clusters can be flattened by promoting the content items from the child cluster into the parent cluster.

The combining of clusters can be dependent on numerous criteria, such as, for example, the number of content items in the cluster, if the cluster does not have a child cluster, if the flattening does not significantly alter statistical criteria of the network prior to flattening, and a hierarchy depth.

In the example of flattening clusters due to the hierarchy depth, the hierarchy depth can be compared to a depth threshold, the clusters being selectively combined depending on the results of the comparison.

A specific example of the process of clustering photographs using the computer system of FIG. 2 will now be described with reference to FIGS. 3 to 9.

Figure 3:
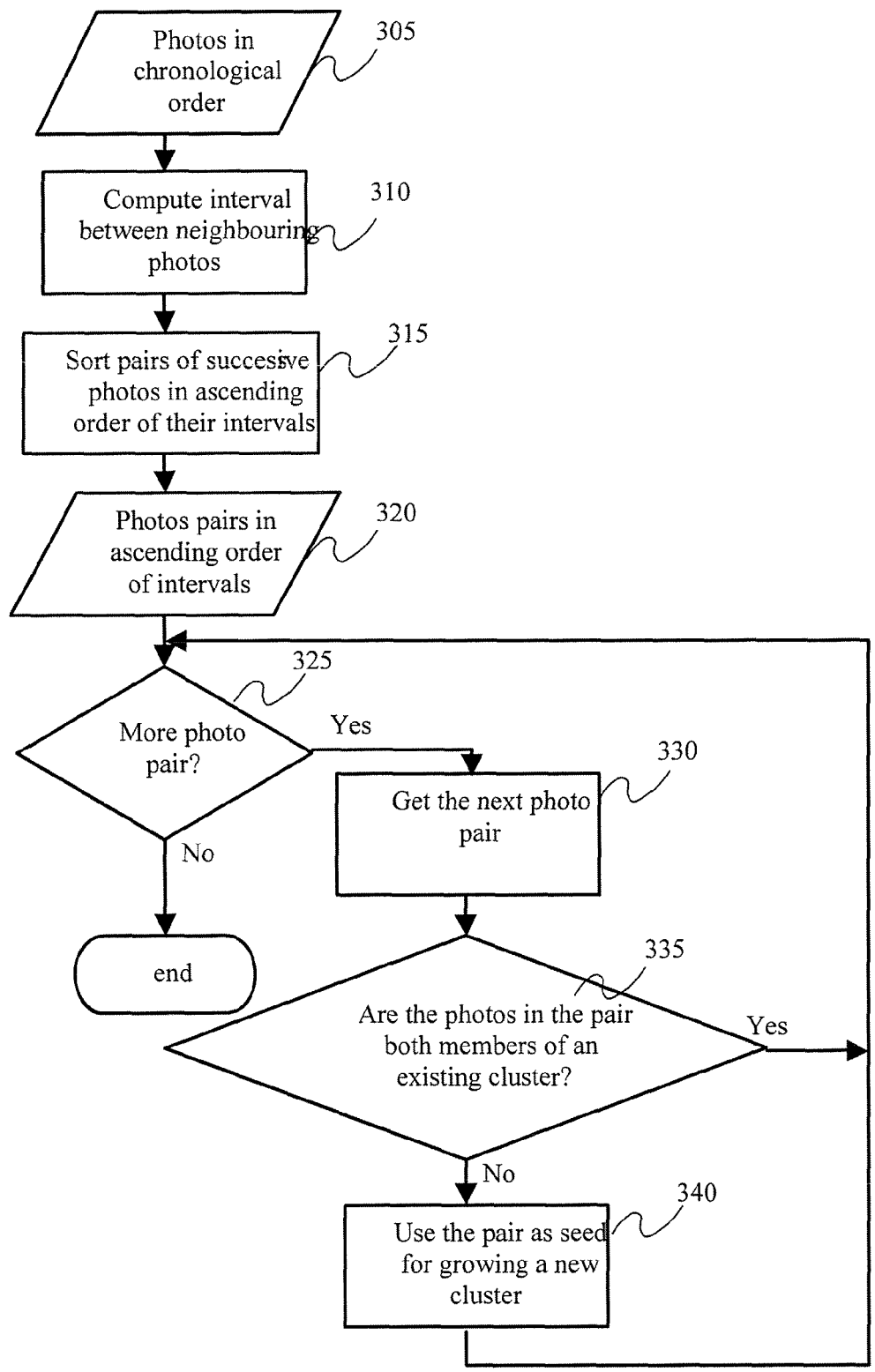
FIG. 3 is a flow chart of a specific example of a process for selecting a seed pair of content items.

The overall process is shown in FIG. 3 in which the computer system 200 receives an input in the form of a collection of photos, 305, arranged in chronological order. At step 310, the computer system 200 computes the interval between the shooting times of neighbouring photos in the collection. For the purpose of the following example, the term interval will be used to refer to the absolute value of the difference between the shooting times of two neighbouring photos in a photo collection. However, as outlined above other intervals, such as the location at which the photos are taken may be used.

At step 315, the computer system 200 sorts pairs of neighbouring photo into a list 320 in ascending order of their intervals. At step 325, if the computer system determines that there are no more photos to be clustered the clustering process terminates.

Otherwise, at step 330, the computer system 200 selects the next photo pair in the sorted list 320. If it is determined by the computer system 200 at step 335 that the photos in the pair are both members of an existing cluster, no more processing is needed for the pair and the process returns to step 325. Otherwise, the computer system 200 uses the pair as a seeding pair for growing a cluster at step 340, as will be described in more detail below.

When the growing step of 340 is completed, the process returns to step 325, to allow the computer system 200 to assess if further photo pairs are yet to be considered.

Accordingly, this example performs time-based event clustering in a bottom-up manner to create a hierarchy of event clusters. The algorithm can therefore use a number of assumptions on how people take photos, including one or more of:

The interval (or time gap) between neighbouring photos of an event is usually much smaller than the interval between neighbouring photos of separate events.

The average interval between neighbouring events depends on the type of events. For instance, the time between the events of a wedding is much shorter than the time between the events of a vacation.

Long events are made up of shorter events which, in turns, are made up of even shorter events.

The interval between neighbouring photos of an event—long or short—does not vary a great deal. That is, within each event, there is a tendency for a camera user to take photo at more or less regular interval. This is the case despite the fact that the same camera user may take photos at markedly different intervals even in two neighbouring events.

Together, the last two assumptions suggest that the time interval between neighbouring photos tends to exhibit some degree of regularity in events at different time scales.

Figure 4:
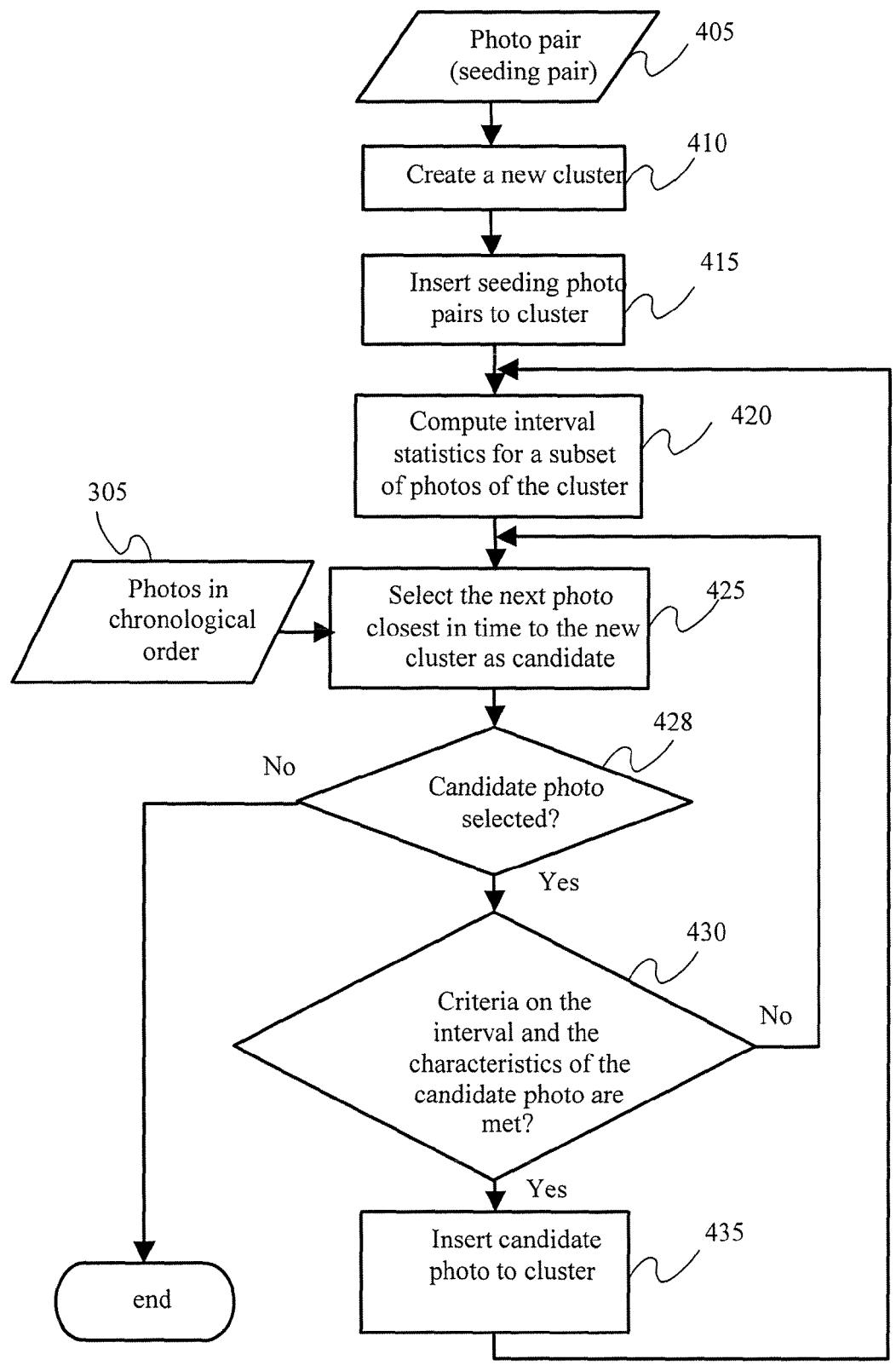
FIG. 4 is a flow chart of a specific example of a process for adding content items to a cluster.

FIG. 4 depicts an example of the key steps of the cluster growing process.

The computer system 200 determines a pair of photos 405 as the seeding pair, as described above for example. At step 410, the computer system 200 creates an empty new cluster and the seeding pair is inserted one photo at a time at step 415. This can be performed using the process shown in FIG. 5, which will be described below.

At step 420 the computer system 200 computes one or more statistics on the interval or some function of the interval such as $\log_{10}(\text{interval})$, of a subset of children of the cluster. In this example, the standard deviation of the interval is computed and all the photos in the cluster are used for computing the standard deviation. However, initially, with just two seeding photos and one interval value, the standard deviation of the interval cannot be computed. To bootstrap the cluster growing process, the standard deviation of the interval is initially set to be the same as the actual interval of the two seeding photos.

At step 425, the next photo in the photo collection of 305 that is closest in time to the newly created cluster is selected. In this example, a photo is only evaluated against a cluster once. The photo closest in time to the cluster will either be the photo just before the earliest photo of the cluster or the photo just after the latest photo of the cluster in chronological order.

If both photos have already been selected and evaluated, no photo will be selected, so at step 428 the computer system 200 checks whether a candidate photo for the cluster is selected for evaluation. If no photo can be selected for evaluation, the growing process is completed, the newly formed cluster has reached its final size and the cluster growing process is terminated.

If a candidate photo is selected, at step 430, the interval between the candidate photo and the newly created cluster and some pre-determined characteristics of the photo are checked against a set of predetermined criteria, by the computer system 200, to decide whether the photo should be part of the newly created cluster. The criteria on the interval are, at least partly based on the interval statistics computed at step 420. Additional criteria can be placed on certain characteristics of the candidate photo such as its colour, luminance, flash setting, zoom setting, the presence of people, the type of event to which the photos relate, etc. The criteria used in this example will be described in detail later with the help of FIG. 6 and FIG. 10.

If the criteria are not met, at step 425 the computer system 200 selects the next photo that is closest in time to the new cluster. If the criteria are met, the process proceeds to step 435 which, in this example, uses the process of FIG. 5 to insert the photo into the newly created cluster.

Figure 5:
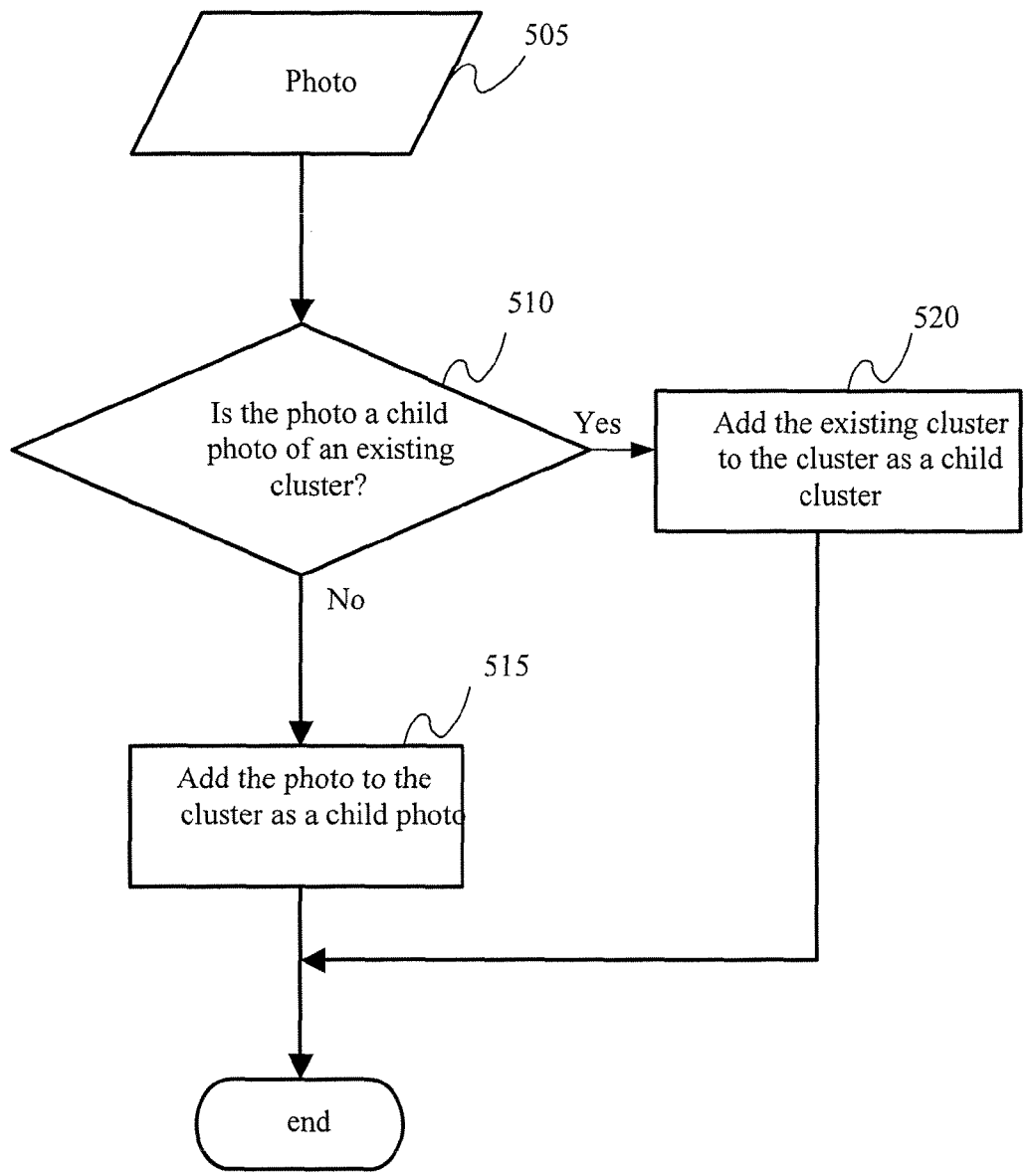
FIG. 5 is a flow chart of a specific example of a process for forming a child cluster.

As shown in FIG. 5, the process of inserting a photo 505 into a cluster involves the computer system 200 checking whether the photo 505 is a member of an existing cluster at step 510. If the photo 505 is a member of an existing cluster, that existing cluster is added to the cluster as a child cluster at step 520. If the photo 505 is not a member of any existing cluster, the computer system 200 adds the photo 505 as a child photo of the cluster at step 515.

A child photo of a cluster C is used in this document to refer to a photo that is directly under the cluster C and not a photo of a descendant cluster of cluster C. A member of a cluster C is used to refer to a photo or a cluster directly under cluster C or under a descendant cluster of cluster C.

Figure 6:
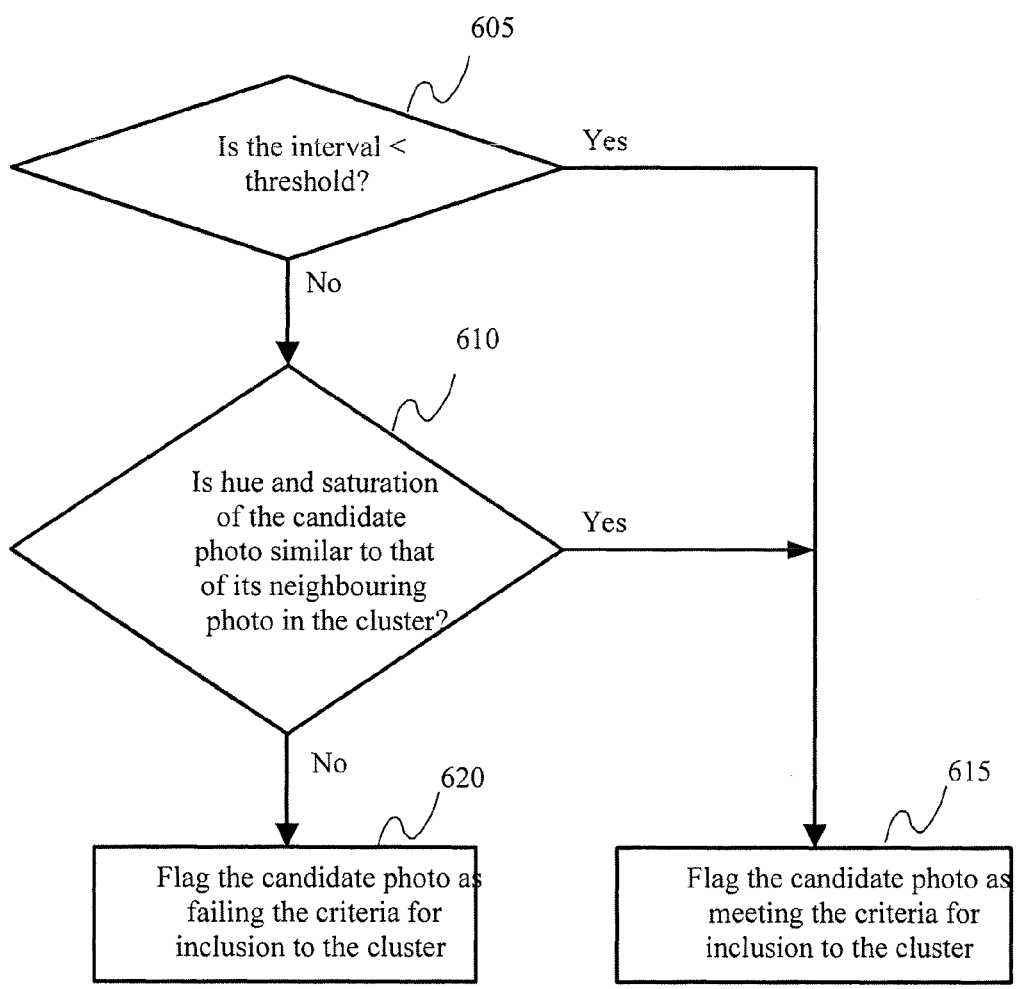
FIG. 6 is a flow chart of a specific example of a process for performing content analysis for clustering content items.
Figure 10:
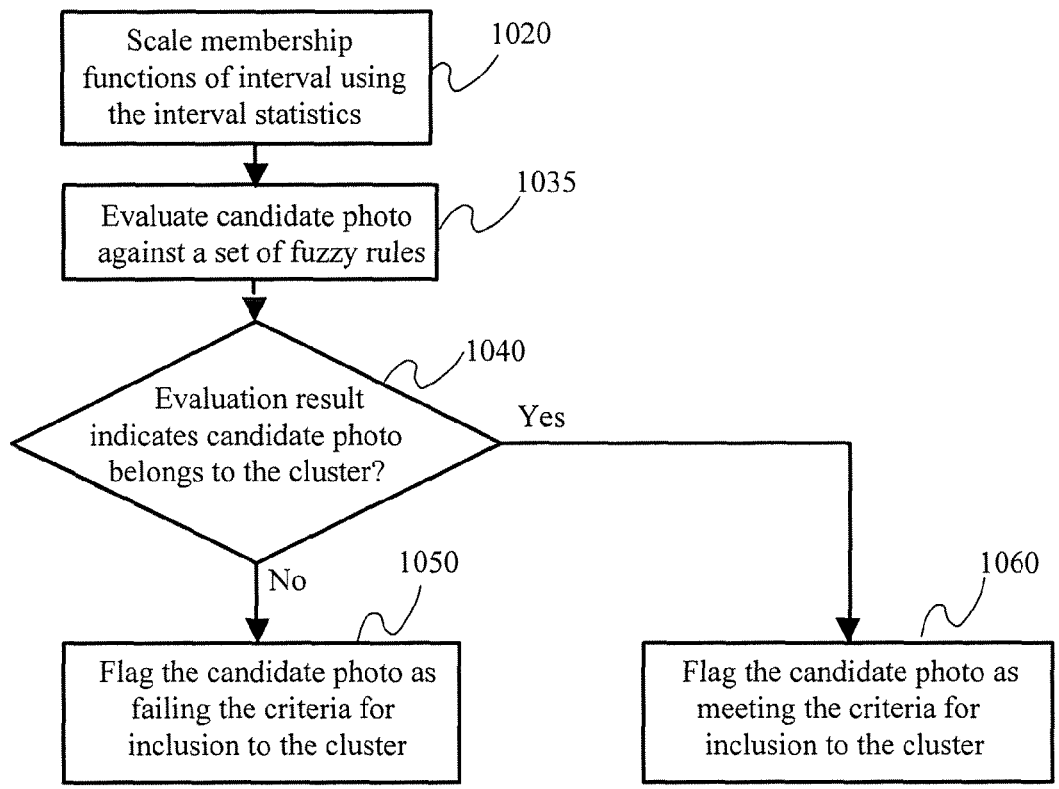
FIG. 10 is another flowchart of another example of a process of clustering content items.

In this example, the criteria used for determining whether a candidate photo should be included in a newly formed cluster is described in FIG. 6 and FIG. 10.

As shown in FIG. 6, the interval between the candidate photo and the newly created cluster is tested against a threshold by the computer system 200, at step 605. In this example, the threshold is set to 3 times the standard deviation of the intervals of the current child members of the newly created cluster. However, different values may be used, for example, depending on the type of event to which the content items relate.

If the interval is smaller than the threshold, the computer system 200 flags the candidate photo as meeting the criteria for inclusion into the cluster at step 615. If the interval is not smaller than the threshold, the process moves on to step 610, to compare the hue and saturation of the candidate against up to 3 of its neighbouring photos in the newly created cluster. The hue and saturation histogram of candidate photo and those of the neighbouring photos are first computed by the computer system 200, before a similarity measure is determined as follows:

$$\text{similarity}(A, B) = \frac{\sum_{i=0}^{N-1} \min(a_i, b_i)}{\sum_{i=0}^{N-1} a_i} \quad (1)$$

where:
- $a_i$ and $b_i$ are the counts of ith bin of the N-bin candidate histogram and the neighbour histogram respectively; and,
- the min( ) function returns the minimum of its arguments' values, between the histogram of the candidate photo, A, and the histogram of each of the neighbouring photo, B, is computed.

The similarity measure is indicative of the portion of the photo's histograms that intersect. In this example, if the similarity between the histogram of the candidate photo and the histogram of at least one of the neighbouring photos is larger than 0.7, the hue and saturation of the two photos are considered to be similar and the candidate photo is flagged as meeting the criteria for inclusion into the cluster, by the computer system 200 at step 615. If the similarity values are all smaller than 0.7, the candidate photo is flagged as failing the criteria for inclusion into the cluster, by the computer system 200 at step 620.

Alternatively, instead of using clustering criteria with crisp thresholds for interval and similarity measures, content items can be clustered by determining a plurality of ordered content items, determining intervals between each successive content item, determining a set of clustering rules and assigning at least one content item to a cluster using the determined clustering rules. In one example, this can be achieved by using fuzzy logic rules.

Notably, the ordering can be performed in any suitable manner, but is typically achieved by ordering the content items based on the value of a variable, such as the time or location at which the content item was created. Alternatively, or additionally, other variables can be used depending on the nature of the content items. Thus, for example, in the case of images, ordering can be performed on the basis of the hue and saturation of the images. The ordering may be predetermined, for example, if the content items are photos downloaded from a camera, or may requiring that sorting is performed, if the content items are not ordered.

The intervals between successive content items can then be determined on the basis of differences in the value of the variable between neighbouring content items, so that in one example, the intervals can be temporal or spatial intervals.

Any suitable clustering rules can be used, but in one example, the clustering rules include fuzzy logic rules, where particular properties of the intervals and the rules are used to determine if a particular content item belongs to a particular cluster.

In one example, the computer system 200 can assign each content item to a cluster at step 130 by creating a current cluster, to which is assigned a first content item from the plurality of ordered content items. The next content item in the order is then evaluated and assigned to the current cluster or a new cluster depending on the clustering rules and the interval to the next content item or the previous content item. The steps for assigning each content item in successive order are then repeated until all content items have been assigned. In one example, the current cluster is the active cluster being assigned current content items. When it is determined that the next content item belongs to a new cluster, the new cluster is then assigned as the current cluster.

The clustering rules may be determined in a variety of ways and may for example be predefined and stored in memory, manually defined, or automatically generated. In one example, statistical analysis can be performed on the intervals, where the statistical analysis is used to determine the clustering rules. An example type of statistical analysis includes computing the mean log time of the intervals, and using the mean log time to determine the clustering rules.

In one example, the clustering rules are formed from a membership function, which defines the likelihood of a content item being a member of a particular cluster. Typically the membership function is predetermined, with the membership function being scaled in accordance with the results of the statistical analysis of the intervals.

Additionally, or alternatively, the clustering rules can be rules defined in accordance with an event type, such that similar rules are used for similar events. Accordingly, if the clustering rules are in the form of a membership function, a predetermined membership function can be used for clustering content items associated with events of a specific type.

The clustering rules are typically one or more fuzzy logic rules, where the fuzzy logic rules can also include content based fuzzy rules such as colour similarity and/or luminance similarity.

Content based fuzzy rules assigns the content items to the current or new clusters based on the interval. This typically involves only providing an absolute assignment in the case of extreme intervals, with content items having intermediate intervals being assigned as boundary cases, which are then subsequently resolved using additional criteria. Accordingly, as discussed below, fuzzy rules do not have crisp boundaries.

Thus, the clustering steps can include determining if a content item is a boundary content item depending on an interval between the content item and a neighbouring content item and if so, assigning the boundary content item to a cluster, depending on at least one content similarity between the content item and at least one other content item of the cluster. The content similarity can include, for example, the colour similarity and/or the luminance similarity between the content item and at least one other content item of the cluster.

Determining whether a content item is a boundary case can be performed by comparing the interval between the content item and a neighbouring content item to at least one threshold, and based on the result of the comparison, using the content based fuzzy rules to assign the boundary content item.

The content items can be ordered in a variety of ways depending on the type of interval analysis that is likely to be performed. The orders include chronological order, and spatial order. Thus, clustering rules can be determined from temporal or spatial intervals.

In one example, the content items are photos or other images. However, the content items may include any form of content item that can be clustered due to a particular item property, and thus may include video clips, documents, or any form of streaming or still data.

An example of the use of fuzzy logic for clustering is shown in FIG. 10. At step 1020, the membership functions of interval are automatically scaled in accordance with the interval statistics of the current cluster computed at step 420. The reasons for the scaling step will be explained in details later. At step 1035, the candidate photo is evaluated against a predetermined set of fuzzy rules. At step 1040 the computer system 200 checks the result of the evaluation obtained at step 1035. If the evaluation result indicates that the candidate photo belongs to the cluster, the computer system 200 flags the candidate photo as meeting the criteria for inclusion into the cluster at step 1060. Otherwise, the computer system 200 flags the candidate photo as failing the criteria for inclusion into the cluster at step 1050.

Fuzzy logic rules use linguistic variables and defined membership functions for them. Each membership function quantifies the degree of true an entity is a member of a fuzzy set. The fuzzy nature of the linguistic terms and their membership functions allows imprecise rules (such as those used by a human in clustering photos) to be defined. For instance, it allows general rules such as:

- if the interval between two photos is short, they most likely belong to the same event cluster;
- if the interval between two photos is long, they most likely belong to different event clusters;
- if the two photos have similar scene and the interval between them is not very long, they may belong to the same event cluster; and
- if the two photos' scenes are not very dissimilar and the interval between them is relatively short, they may still belong to the same event cluster to be specified.
if the two photos' scenes are not very dissimilar and the interval between them is relatively short, they may still belong to the same event.

The use of fuzzy boundaries instead of crisp boundary makes inference less sensitive to boundary conditions of parameters. The ability of fuzzy inference engine to make use of membership degrees to combine the effect of the fired rules also results in more robust decision and behaviour.

Examples of fuzzy sets are the sets of interval values that are regarded as long, the set of similarities values on hue and saturation that are regarded as indicating similar colours, etc. Typically membership functions are predetermined. As for the membership functions of interval shown in FIG. 11, a reference set of membership functions are automatically scaled at step 1020 in accordance with the interval statistics of the current cluster computed at step 420. This is because clusters at top level of the cluster hierarchy represent long events that are made up shorter events represented by clusters lower in the hierarchy. What is considered as a long (or short) interval is different in a long event and in a short event. For instance, a holiday may take a week and an interval of an hour is not regarded as long in that time frame. However, an hour interval will be regarded as long for a dinner during the holiday.

Figure 11A:
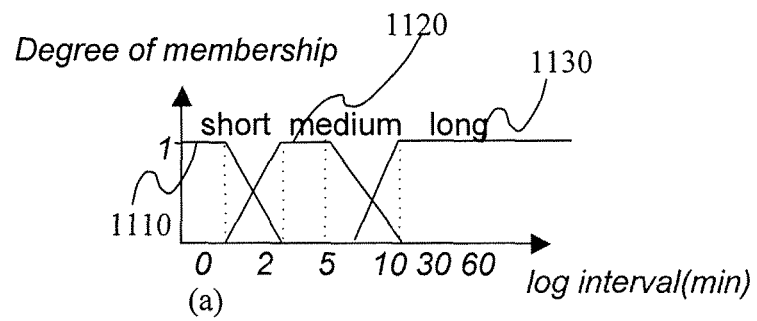
FIG. 11A is an example of the membership functions of the fuzzy variable interval.
Figure 11B:
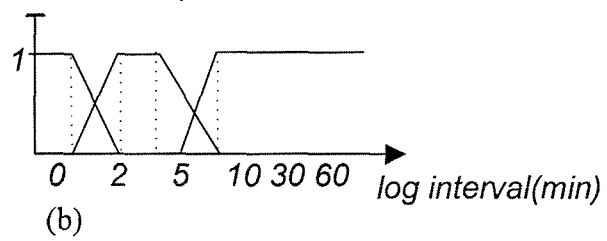
FIG. 11B is an example showing the scaling of the membership functions of the fuzzy variable interval.

FIG. 11A shows an example of a reference set of 3 membership functions: short 1110, medium 1120 and long 1130, of an interval plotted on a degree of membership/log interval graph. Each membership function f is a piecewise linear function of 4 parameters:

$$f(x; x_1, x_2, x_3, x_4) = \begin{cases} 0, & x < x_1 \\ \frac{x - x_1}{x_2 - x_1}, & x_1 \leq x < x_2 \\ 1, & x_2 \leq x < x_3 \\ \frac{x_4 - x}{x_4 - x_3}, & x_3 \leq x < x_4 \\ 0, & x_4 \leq x \end{cases} \quad (2)$$

where the parameters $x_1$, $x_2$, $x_3$ and $x_4$ can be $\infty$ and $x_1 \leq x_2 \leq x_3 \leq x_4$.

The membership functions for short, medium and long intervals are f(x; 0, 0, 2, 5), f(x; 2, 5, 10, 30) and f(x; 10, 60, $\infty$, $\infty$) respectively. The reference set of membership functions is obtained by tuning the membership functions manually over representative sets of photos from some common events.

Assuming that the interval statistics used is the mean log interval of the cluster and the mean log interval of these representative photos be $I_0$. At step 1015, the mean log interval of the of the photos in the cluster, I, is computed. The parameters of the reference set of membership functions of FIG. 11A are then scaled by the factor $I/I_0$ to form a scaled set of membership functions (such as those of FIG. 11B) which is then used in the fuzzy rules to determine whether the photo should be included in the cluster.

Figure 8:
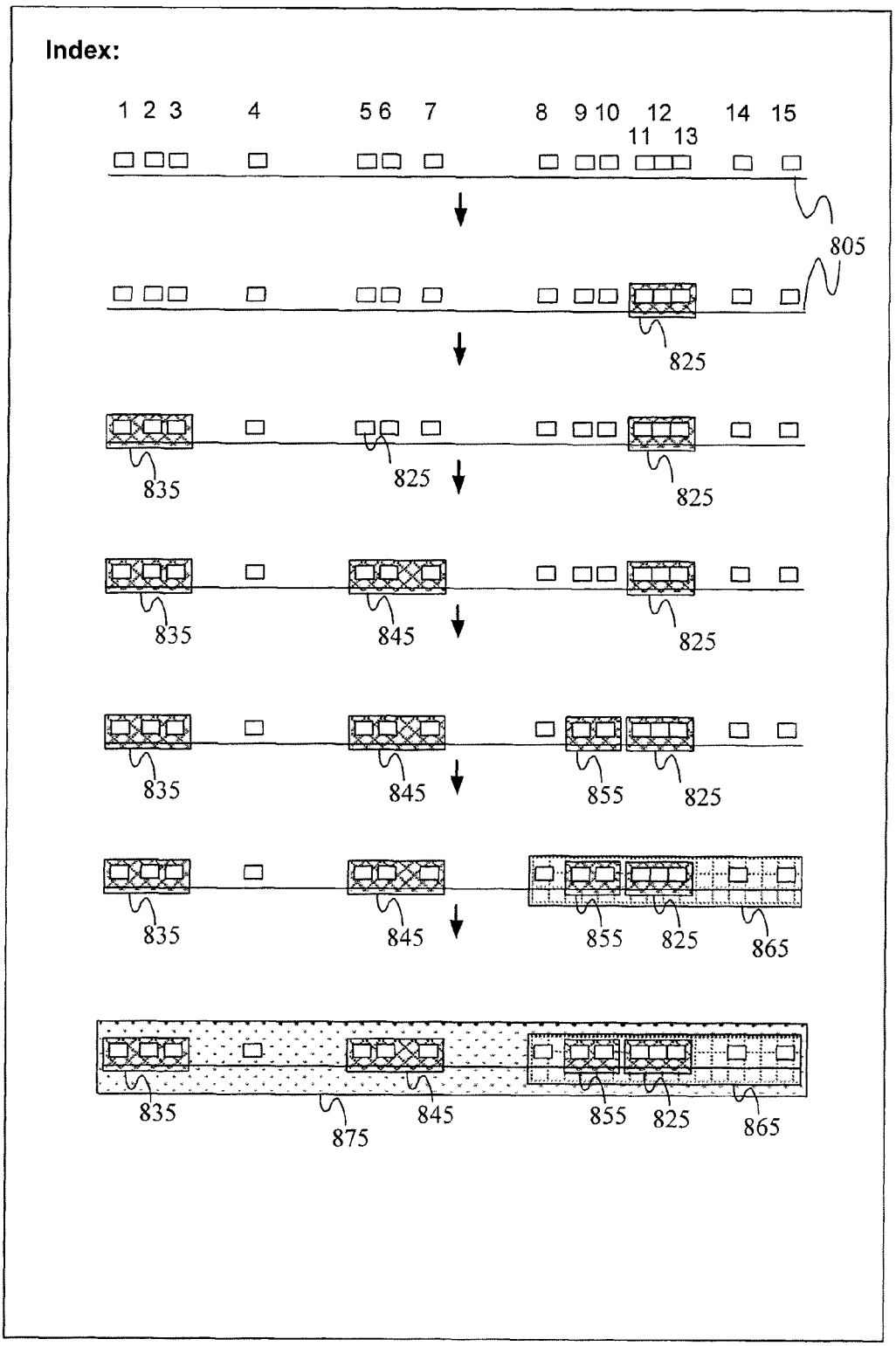
FIG. 8 is an example used for illustrating the clustering process of FIG. 1.

When computing interval statistics for a cluster at step 420, in case there are existing child clusters within the cluster, each child cluster (which may also have child clusters of its own) is treated as a single "photo" with non-zero temporal extent. That is, while the intervals between a child cluster and its neighbouring photos/child clusters are included in computing the statistics, intervals between the child cluster's own photos/child clusters are ignored. Statistics including the mean of the interval, the root-mean-square of the interval, the mean log time of the interval, etc. can be used In FIG. 8, a more concrete example is used to further illustrate the working of the clustering method. The example assumes a collection of 15 photos each represented by a rectangle on a timeline 805. The numbers at the top of FIG. 8 are the indexes of the photos in chronological order.

At step 310 the computer system 200 computes the interval of neighbouring photos creating a list shown at 910 in FIG. 9. This list includes pairs of photos arranged in ascending order of their intervals. The first column identifies the interval, whilst the second and third columns contain the photo index of the earlier and latter photo of a photo pair respectively.

At step 325 the computer system 200 determines that there are 14 more photo pairs to be evaluated and retrieves the next photo pair, in this case, photos 11, 12, at step 325. As the photos are not members of an existing cluster, they are used as a seeding pair at step 340 to grow a cluster.

A new cluster 825 is created at step 410, with the seeding pair photos 11, 12 being inserted into the new cluster 825 at step 415, using the process of FIG. 5. Since neither photo 11, 12 is a member of an existing cluster, step 515 is used to add each of them to the new cluster 825 as a member photo.

The process continues with the computer system 200 computing interval statistics for a subset of photos of the new cluster 825. In this example, the standard deviation of the interval of all neighbouring child members (photos and clusters) in the new cluster is computed. However, for a newly created cluster with just two children, the interval between them, in this case $i_{11}$, is taken to be the standard deviation to bootstrap the growing process.

Since photo 13 is closer than photo 10 to the newly created cluster 825 in time, the photo 13 is selected as the candidate photo at step 428.

At step 430, the computer system 200 uses the process of FIG. 6 to check whether photo 13 meets the criteria required for its inclusion into the new cluster 825. At step 605 the computer system 200 determines the interval $i_{12}$ between the photos 12, 13 is smaller than the current threshold which is ($3 * i_{11}$), hence, photo 13 is flagged as meeting the criteria at step 615, and is inserted into the new cluster 825, using the process of FIG. 5.

Returning to step 420, the computer system 200 recomputes the interval statistics of the new cluster 825. The standard deviation is now std($i_{11}$, $i_{12}$). At step 425 the computer system 200 selects the next photo closest to the new cluster 825, in this case evaluating the photo 10 in a similar way to photo 13.

However, in the case of photo 10, the computer system 200 determines it does not meet the interval criteria at step 605 as $i_{10} \geq 3* \text{std}(i_{11}, i_{12})$. At step 610, the computer system 200 determines that the hue and saturation of photo 10 is not similar to its three neighbouring photos: photos 11, 12, 13, and accordingly, the photo 10 is flagged as failing the clustering criteria at step 620. As a result, the computer system 200 returns to step 425 to select the next photo, photo 14, which is next closest to the new cluster 825. In this example, the photo 14 follows the same fate as the photo 10 and fails the clustering criteria of FIG. 6.

The computer system 200 again returns to step 425, but this time determines that the neighbouring photos on the timeline at each end of the new cluster 825 have already been selected for evaluation, and that consequently no candidate photo can be selected. Hence, at step 428, the computer system 200 determines that the growing process for the new cluster 825 has been completed and returns to step 325.

As there are 13 more photo pairs in the list 910 of FIG. 9, the computer system 200 proceeds to step 330 to retrieve the next photo pair, including the photos 12, 13. At step 335, the computer system 200 determines that the photos 12, 13 are both members of cluster 825, so the process returns to step 325.

There are still 12 more photo pairs in the list 917, so the computer system 200 retrieves the next photo pair, including photos 2, 3 at step 320. Since they are not members of an existing cluster, the computer system 200 uses the photos 2, 3 as seeding pair to create a new cluster 835.

The clustering process then continues in a similar manner to create the clusters 845, 855, 865, until the last cluster 875 of FIG. 8 is created with the seeding pair of photos 3, 4.

When the computer system 200 inserts the photo into the new cluster 875, the photo 3 is a child photo of cluster 835, and cluster 835 is therefore added to the cluster as a child cluster of the new cluster 875. After the computer system 200 adds the photo 4 into the new cluster 875, the process returns to step 420 with the computer system 200 computing the interval statistics of the new cluster. The cluster 835 is considered as effectively a 'photo' with non-zero temporal extent, so that the intervals between neighbouring photos of cluster 835 are not used for computing the interval statistics. Consequently, the interval between cluster 835 and photo 4, that is, $i_3$, is used as the standard deviation of the interval to bootstrap the cluster growing process of FIG. 6.

During the growing of the new cluster 875, photo pair: photo 7, 8, and photos 4, 5, are evaluated in turn. In both cases, their intervals are found to be within the interval thresholds required by the clustering criteria, that is, $i_7 < (3* i_3)$ and $i_4 < 3* \text{std}(i_3, i_7)$. Hence, or their associated cluster are added to the new cluster 875.

When the computer system 200 returns to step 325. There are two more photo pairs left in the list 910, however, both pairs are members of cluster 875. Hence, they are both skipped at step 335, and as there are no more photo pairs in the list 910 and the clustering process ends.

In this example, the process creates a hierarchy of clusters. In some applications, it may be necessary to impose some maximum depth on the cluster hierarchy. For instance, a photo album with more than 4 nested levels may be hard to navigate on a TV screen.

To ensure that the depth of the cluster hierarchy is equal to or smaller than a pre-determined maximum, a compacting process can be performed after the hierarchy of clusters has been created. An example of this will now be described with reference to FIG. 7.

At step 710, the computer system 200 checks the current depth of the cluster hierarchy against a predetermined maximum depth. If the current depth is less than or equal to the maximum depth, no compacting is required and the compacting process terminates.

Otherwise, clusters that have only a small portion or a large portion of their photos directly under them and a single child cluster that is a leaf cluster (that is, a cluster with no child clusters of its own), are flattened by the computer system 200 at step 715.

In this example, the portion of child photos of a cluster (over the total number of photos under the cluster and its descendant clusters) must be smaller than 25% or larger than 75% for it to be flattened. By flattening a cluster, we mean that any nested structure within the cluster (but not the photos inside the structure) is removed reducing the cluster into a sequence of photos. In this example, clusters that do not lie on a branch that exceeds the maximum depth are not considered for flattening.

The current depth of the cluster hierarchy is checked again at step 720, and if the computer system 200 determines the current depth is less than or equal to the maximum depth, no further compacting is required and the compacting process terminates.

If the current depth still exceeds the maximum depth, at step 725, the computer system 200 flattens clusters in branches that exceed the maximum depth and have a total of fewer than n photos under it and their descendant clusters.

At step 730, the computer system 200 checks the current depth of the cluster hierarchy and if the current depth is less than or equal to the maximum depth, no further compacting is required and the compacting process terminates.

If the current depth still exceeds the maximum depth, at step 735 the computer system 200 determines clusters with child clusters along branches that exceed the maximum depth and promotes the child clusters and child photos by replacing the clusters themselves.

For example, for a cluster C which has parent cluster P and child cluster $c_1$ to $c_r$, and child photos $p_1$ to $p_s$, when the children of C are promoted, C will be removed from the cluster hierarchy and $c_1$ to $c_r$, and $p_1$ to $p_s$ become child clusters and child photos of P respectively; hence, reducing the depth of that particular branch by 1.

In order for the child clusters and child photos of the cluster C to be promoted, the promotion should result in little or no change to certain statistics on the child clusters of cluster P, the parent cluster of C. In this example, the standard deviation of the size of the child clusters of P after the promotion should be less than 1.1 times its value before the promotion.

Following this, the current depth of the cluster hierarchy is checked again at step 740, and if the current depth is less than or equal to the maximum depth, no further compacting is required and the computer system 200 terminates the compacting. If the current depth still exceeds the maximum depth, as a last resort, all clusters that exceed the maximum depth are flattened by the computer system 200 at step 745 and the compacting process terminates.

Figure 7:
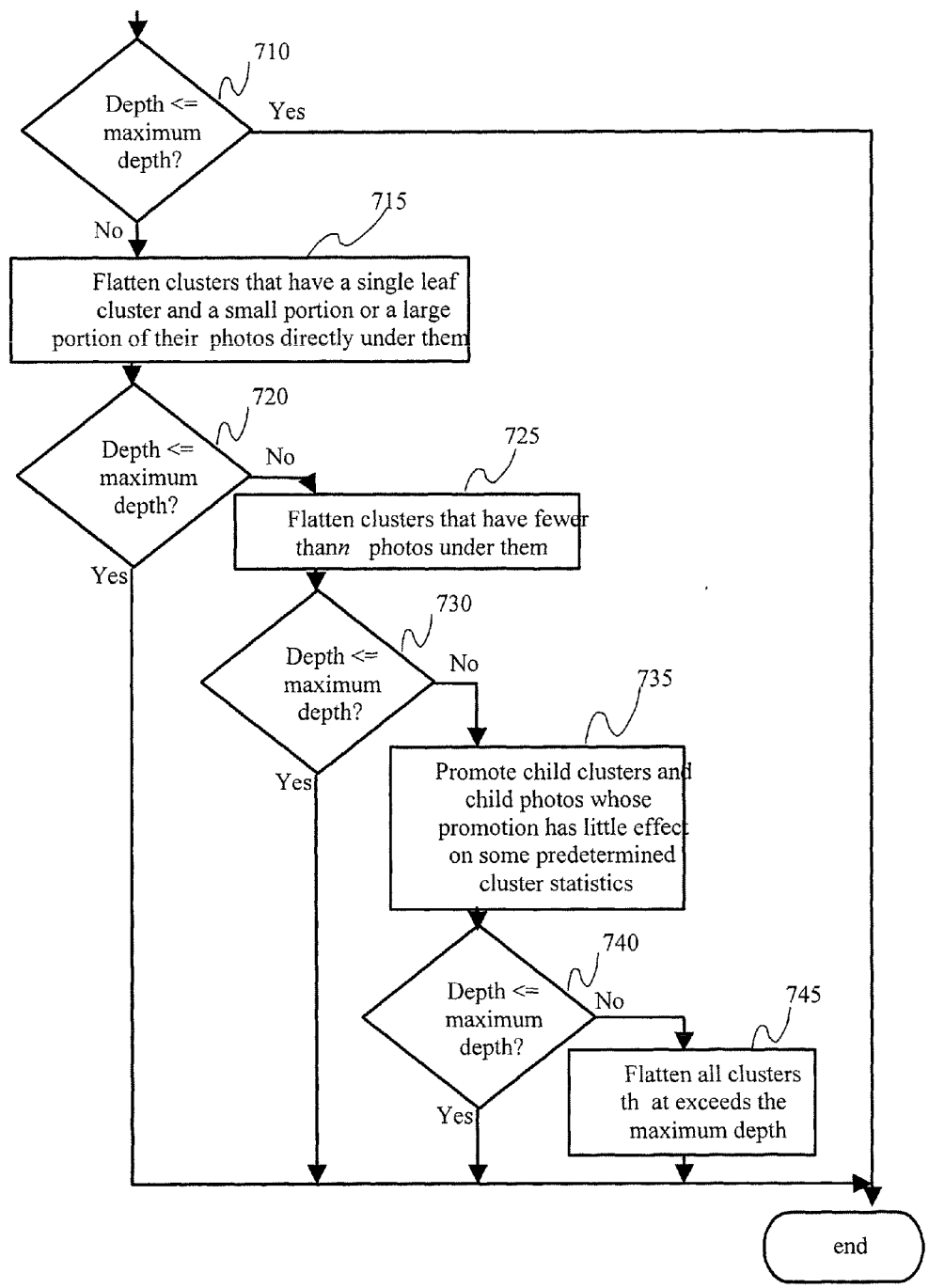
FIG. 7 is a flow chart of a specific example of a process for compacting clusters.

In an alternative example, compacting step 715, 725 and 735 of FIG. 7 can be used to make the cluster hierarchy easier to navigate and present even if the depth of the cluster hierarchy is not more than a predetermined depth.

In this example, step 335 of FIG. 3 checks whether the photos in a photo pair are both members of the same existing cluster and uses the pair as a seeding pair only if they are not.

In an another example, step 335 of FIG. 3 requires the seeding pair to be made up of photos that are not member of any existing clusters. In addition, step 425 of FIG. 4 may be used to only select a photo as candidate photo for growing the cluster if it is not a member of any existing clusters. In this example, the process results in a single level of non-overlapping clusters instead of a hierarchy of photo clusters.

Figure 12:
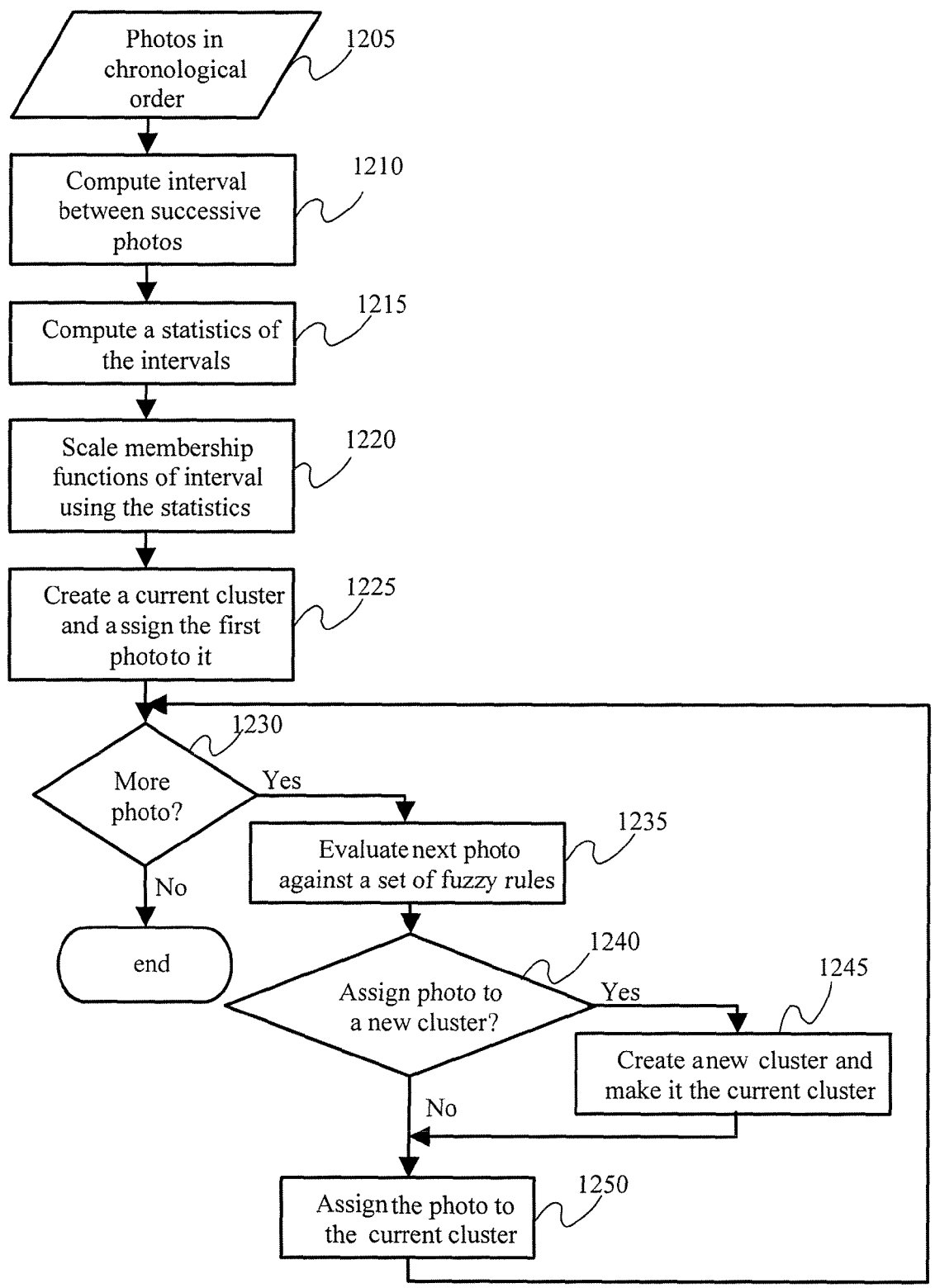
FIG. 12 is a flow chart of a specific example of a process of clustering content items; and, FIG. 13 is an example showing how clusters (or cluster boundaries) are formed by evaluating photos one by one against a set of fuzzy rules.

In yet another example, the fuzzy cluster evaluation step described in FIG. 10 can also be used on its own to produce a single level of non-overlapping cluster. FIG. 12 depicts a specific example of such a system.

A collection of photos are accepted as input to the computer system at step 1205, in chronological order. At step 1210, the interval between the shooting times of successive photos in the collection are computed. In this example, the interval refers to the absolute value of the difference between the shooting times of two successive photos in a photo collection. At step 1215, statistics of the intervals are computed. The statistics are used to scale a default set of membership functions of the interval at step 1220. In this example, the mean log interval is computed and used for scaling the membership functions.

At step 1225, a current cluster is created and the first photo assigned to it. It is then determined if there are more photos at step 1230.

If so, at step 1235, the next candidate photo of 1205 is evaluated against a predetermined set of fuzzy rules. At step 1240 the computer system checks the result of the evaluation obtained at step 1235. If a new cluster is not required, the candidate photo is assigned to the 'current' cluster at step 1250. If the candidate photo has to be assigned to a new cluster, a new cluster is first created at step 1245 and made the 'current' cluster before the candidate photo is assigned to the newly appointed 'current' cluster at step 1250.

In the event that the intervals do not provide sufficient clustering, or for resolving boundary cases, other content item properties can be used to provide more definitive clusters.

Figure 13:
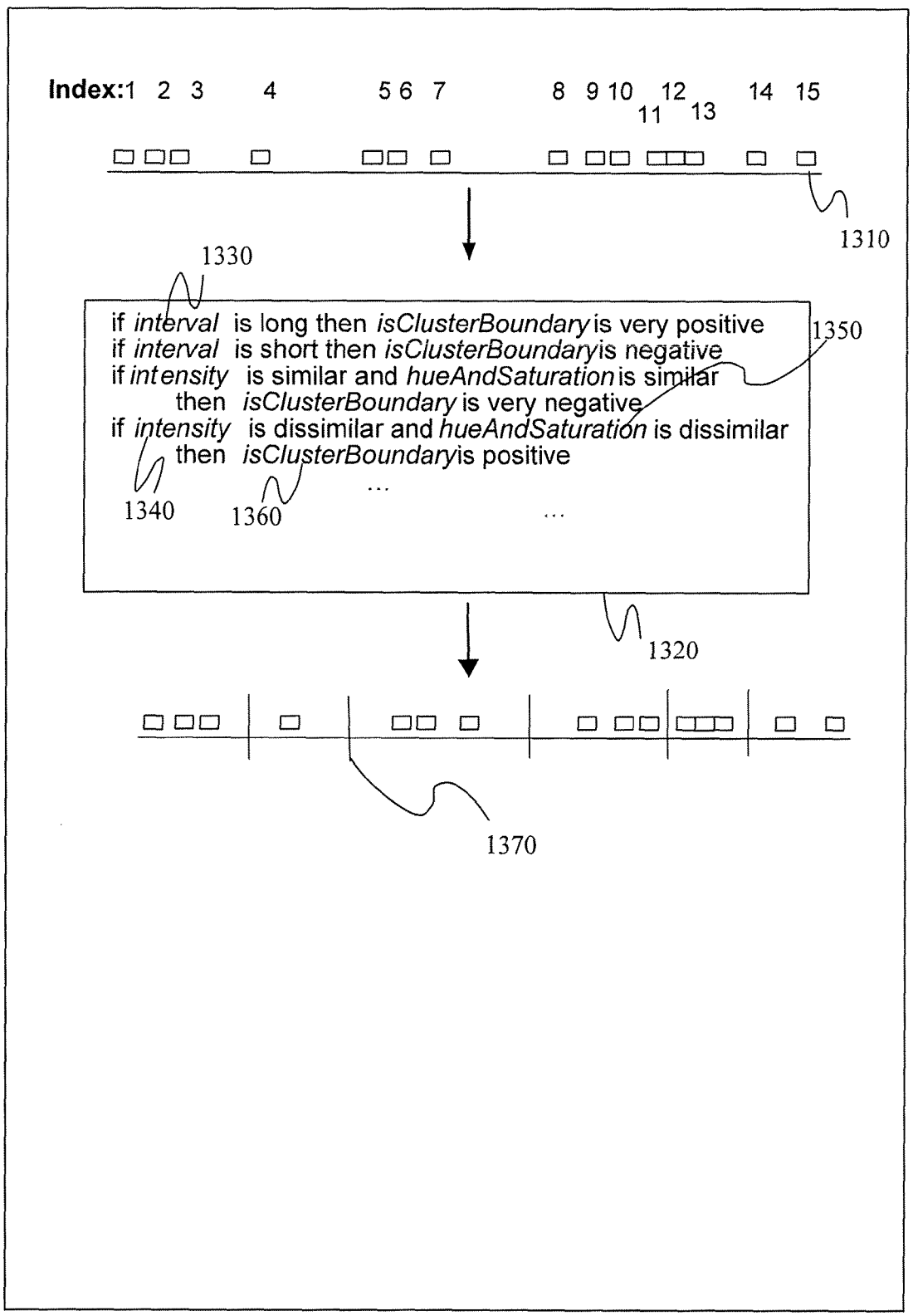

FIG. 13 provides an example set of fuzzy rules 1320 used for the clustering of photos. In addition to interval 1330 (which has been described in FIGS. 11A and 11B), the four fuzzy rules shown make use of three other linguistic variables: intensity 1340, hueAndSaturation 1350 and isClusterBoundary 1360.

The linguistic variables intensity 1340 and hueAndSaturation 1350 relate to specific properties of content items such as photographs, and can be used to assign the content item to a cluster in the event that the content item cannot be assigned to a cluster based on the interval alone. Thus, for example, if the likelihood of membership is not sufficiently definite to resolve the content items membership of the cluster, additional content item properties can be assessed.

In this example, the variable, hueAndSaturation, has two possible values: similar and dissimilar. In this example, the membership functions of hueAndSaturation are defined using some commonly used similarity measure (such as the intersection of two histograms over the size of the histogram) between the hue and saturation histogram of the candidate photo and those of its neighbouring photos in the 'current' cluster. Similarly, the variable intensity, has two possible values: similar and dissimilar. However, in the case of intensity, the membership functions are based on luminance histograms.

The output variable, isClusterBoundary, serves as a fuzzy indicator on the presence of a cluster boundary. It has two possible values: positive and negative, which reflects the system's (degree of) belief on whether the candidate photo should be assigned to a new cluster or not. In one example, the membership function of positive is defined using equation (1) as $f(x; 0, 1, 1, 1)$ while that of negative is defined as $f(x; -1, -1, -1, 0)$.

In FIG. 13, the example is based on a collection of 15 photos each represented by a rectangle on a timeline 1310. The numbers at the top of FIG. 13 are the indexes of the photos arranged in chronological order. The first photo is used for creating an initial cluster. Then, the fuzzy rules 1320 are evaluated against each of the photos in turns starting from the 2nd photo. After each evaluation, the variable isClusterBoundary is defuzzified. The firing of various fuzzy rules has created a fuzzy set for the variable isClusterBoundary.

Defuzzification transforms the composited fuzzy set of isClusterBoundary to a crisp number (typically using the centroid method). In this example, if the defuzzified value of isClusterBoundary is greater than 0, the candidate photo is added to a new cluster creating a new cluster boundary such as 1370 in FIG. 13. Accordingly, defuzzification allows for a boundary case to be clustered in a more definitive way.

Thus, the above described process allows event-based clustering using fuzzy logic, which can provide advantages such as:

Vague knowledge including concepts used by human in clustering photos can be easily represented and applied.
Rules are readable and can be interpreted.
Rules can be easily weighed and combined.
Fuzzy classifiers are easy to implement.
Fuzzy rules do not require crisp thresholds.

The inventive step of scaling a reference set of membership functions of interval based on some interval statistics of the current cluster avoid the poor performance caused by a small set of pre-defined membership functions that can only cater for a limited set of event types and the complexity of having a large number of pre-defined membership functions to cater for a large set of event types.

The above described process therefore alleviates the prior art clustering problems by automatically organising content items into clusters making it easier to browse, annotate and search the photos. Whilst the above described examples focus on the application of the techniques to content items such as photos, it will be appreciated that the techniques can be applied to any suitable content items, such as video clips, images, documents, or the like.

Whilst the described examples, focus on temporal intervals, it will be appreciated that any suitable interval may be used, such as a spatial interval or the like. Thus, the content items can be ordered using any suitable interval depending on the type of content item, and the type of clustering to be performed. Thus, for example, the ordering can include chronological or spatial ordering.

Throughout the above description the term cluster is understood to refer to any group of one or more content items. Thus, the proposed methods may be applied to single content items, as it is the same as populating each cluster with one content item.

The term processing system is understood to encompass the computer system 200, as well as any other suitable processing system, such as a set-top box, PDA, mobile phone, or the like.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely", or "having" or "including", and not "consisting only of". Variations of the word "comprising", such as "comprise" and "comprises" have correspondingly varied meanings.

The claims defining the invention are as follows:

1. A method for creating a hierarchy of clusters of a plurality of images, the method being performed by a processing system including a processor and a memory unit coupled to the processor, the method comprising:
   a) determining interval lengths between pairs of neighboring images of the plurality of images, each interval length being the difference between the values of a parameter associated with the images of each pair, at least one of the images being stored in the memory unit;
   b) sorting all pairs of neighboring images of the plurality of images in an order of the determined interval lengths;
   c) selecting a seed pair of images based on the determined interval lengths;
   d) assigning the seed pair to a first cluster;
   e) determining an interval length between one of the images in the first cluster and a neighboring image in a second cluster;
   f) comparing (i) the interval length between the image in the first cluster and the neighboring image in the second cluster to the interval length of the seed pair and (ii) at least one visual characteristic of the image in the first cluster and the neighboring image in the second cluster; and
   g) based on the comparing:
      (i) assigning the neighboring image to the first cluster based on the result of the comparing; and
      (ii) combining the first cluster and the second cluster to form a single cluster, the second cluster being a child cluster of the first cluster in the hierarchy of clusters of the plurality of images.

2. A method according to claim 1, wherein the method further comprises, in the processing system, and in response to an unsuccessful comparison, selecting a new seed pair according to the sorted order, the new seed pair being assigned to a third cluster.

3. A method according to claim 1, wherein the method further comprises, in the processing system:
   a) selecting a pair from the sorted pairs;
   b) determining if each of the images of the selected pair is a member of an existing cluster; and
   c) at least one of:
      i) assigning the selected pair to be a seed pair if at least one seed pair image is not a member of the existing cluster; and
      ii) selecting another pair if the images of the selected pair are members of an existing cluster.

4. A method according to claim 1, wherein the method further comprises, in the processing system, depending on the comparing step:
   a) selecting the neighboring image;
   b) selecting the seed pair; and
   c) comparing at least one visual characteristic of the selected neighboring image to at least one visual characteristic of an image in the first cluster, and in accordance with the comparison, at least one of:
      (1) in response to a successful comparison, assigning the selected neighboring image to be a member of the first cluster;
      (2) selecting another neighboring image of the image in the first cluster; and
      (3) selecting another seed pair.

5. A method according to claim 4, wherein the at least one visual characteristic of the selected neighboring image and the at least one visual characteristic of an image in the first cluster includes a color histogram and a luminance histogram of the images.

6. A method according to claim 1, wherein the comparing step is relative to a predetermined criterion including an interval length threshold.

7. A method according to claim 6, wherein the method further comprises, in the processing system:
   a) computing interval length statistics for a subset of images in a current cluster; and
   b) selecting the interval length threshold based on the computed statistics.

8. A method according to claim 7, wherein the interval length statistics are based on a standard deviation of interval lengths between the images in the subset.

9. A method according to claim 1, wherein the clustered images form at least one of:
   a) a network of related clusters;
   b) nested clusters; and
   c) a hierarchical cluster structure.

10. A method according to claim 1, wherein the method further comprises, in the processing system, combining at least two related clusters by forming a single cluster containing images from the at least related two clusters.

11. A method according to claim 10, wherein the at least two related clusters form a child and parent clusters, and wherein the method further comprises, in the processing system, flattening clusters by promoting the images from the child cluster into the parent cluster.

12. A method according to claim 11, wherein the method further includes in the processing system, combining clusters dependent on at least one of:
   a) a number of images in the single cluster;
   b) if the single cluster has a single child cluster whose child images account for less than a first predetermined portion or more than a second predetermined portion of all of their images under them including those in their descendant clusters,
   c) if the flattening of the clusters causes statistical criteria of a network to change by a predetermined amount; and
   d) a hierarchy depth.

13. A method according to claim 12, wherein the method further comprises, in the processing system:
   a) comparing the hierarchy depth to a depth threshold; and
   b) selectively combining clusters dependent on a result of the comparison of the hierarchy depth to the depth threshold.

14. A method according to claim 12, wherein the statistical criteria are based on a standard deviation of a size of the child cluster.

15. A method according to claim 1, wherein the interval lengths comprise at least one of:
   a) temporal intervals; and
   b) spatial intervals.

16. A method according to claim 1, wherein the method further comprises, in the processing system:
   a) performing a statistical analysis on the determined interval lengths; and
   b) using the statistical analysis to determine a predetermined criterion, wherein comparing the interval length between the image in the first cluster and the neighboring images in the second cluster to the interval length of the seed pair is performed according to the predetermined criterion.

17. A method according to claim 16, wherein the predetermined criterion includes a predetermined membership function, and wherein the method further comprises, in the processing system:
  a) determining an interval between a first image of the plurality of images and a neighboring image neighboring the first image;
  b) selectively assigning the first image to a cluster by applying the predetermined membership function to the interval;
  c) determining, using the predetermined membership function, a likelihood of the first image being a member of the cluster;
  d) assigning the first image to the cluster based on the determined likelihood;
  e) scaling the predetermined membership function in accordance with the determined interval to determine the predetermined criterion;
  f) determining an event type for an event to which the images relate;
  g) selecting the predetermined membership function in accordance with the determined event type;
  h) determining if the first image is a boundary image using the membership function;
  i) if the boundary determining step determines that the first image is a boundary image, assigning the boundary image to a cluster depending on at least one visual characteristic used to assign the boundary image to a cluster;
  j) determining at least one criterion relating to the visual characteristic; and
  k) assigning an image to a cluster using the at least one criterion and the determined visual characteristic.

18. A method according to claim 17, wherein the method further comprises, in the processing system, determining the boundary image by comparing an interval between the first image and a neighboring image neighboring the first image to at least one threshold.

19. A method according to claim 17, wherein when the first image is a photograph, the at least one visual characteristic used to assign the boundary image to a cluster comprises:
  i) an intensity; and
  ii) a hue and a saturation;
  wherein the criterion relates to at least one of:
    i) a color similarity between the first image and at least one other image of the cluster; and
    ii) a luminance similarity between the first image and at least one other image of the cluster; and
  wherein the method further comprises:
    a) determining a histogram relating to the visual characteristic for the first image and the at least one neighboring image neighboring the first image;
    b) determining a similarity measure using the determined histogram; and
    c) selectively assigning the first image to the cluster using the determined similarity.

20. A method according to claim 16, wherein the predetermined criterion includes one or more fuzzy logic rules;
  wherein the method further comprises, in the processing system:
    a) using a set of clustering rules to determine an output variable for one of the images of the plurality of images, the output variable being a fuzzy indicator; and
    b) defuzzifying the fuzzy indicator to thereby assign the one of the images of the plurality of images to a cluster.

21. A method according to claim 1, wherein the determining step a) determines interval lengths between all pairs of neighboring images of the plurality of images.

22. An apparatus for creating a hierarchy of clusters of a plurality of images, the apparatus comprising:
  a memory unit;
  a processor coupled to the memory unit, wherein the processor is configured to perform the steps of:
    a) determining interval lengths between pairs of neighboring images of the plurality of images, each interval length being the difference between the values of a parameter associated with the images of each pair, the images being stored in the memory unit;
    b) sorting all pairs of neighboring images of the plurality of images in an order of the determined interval lengths;
    c) selecting a seed pair of images based on the sorting;
    d) assigning the seed pair to a first cluster;
    e) determining an interval length between one of the images in the first cluster and a neighboring image in a second cluster;
    f) comparing (i) the interval length between the image in the first cluster and the neighboring image in the second cluster to the interval of the seed pair and (ii) a visual characteristic of the image in the first cluster and the neighboring image in the second cluster;
    g) based on the comparing:
      (i) assigning the neighboring image to the first cluster based on the comparing; and
      (ii) combining the first cluster and the second cluster to form a single cluster, the second cluster being a child cluster of the first cluster in the hierarchy of clusters of the plurality of images.

23. An apparatus according to claim 22, wherein the determining step a) performed by the processor determines interval lengths between all pairs of neighboring images of the plurality of images.

24. A non-transitory computer-readable medium having stored therein computer-executable code for causing a processing system to perform a method of creating a hierarchy of clusters of a plurality of images, the method including the steps of:
  a) determining interval lengths between pairs of neighboring images of the plurality of images, each interval length being the difference between the values of a parameter associated with the images of each pair;
  b) sorting all pairs of neighboring images of the plurality of images in an order of the determined interval lengths;
  c) selecting a seed pair of images based on the sorted order;
  d) assigning the seed pair to a first cluster;
  e) determining an interval length between one of the images in the first cluster and a neighboring image in a second cluster;
  f) comparing (i) the interval length between the image in the first cluster and the neighboring image in the second cluster to the interval length of the seed pair and (ii) a visual characteristic of the image in the first cluster and the neighboring image in the second cluster;
  g) based on the comparing:
    (i) assigning the neighboring image to the first cluster based on the comparing; and
    (ii) combining the first cluster and the second cluster to form a single cluster, the second cluster being a child cluster of the first cluster in the hierarchy of clusters of the plurality of images.

25. A non-transitory computer-readable medium according to claim 24, wherein the determining step a) determines interval lengths between all pairs of neighboring images of the plurality of images.

* * * * *